US012738531B2

(12) United States Patent
Mattis et al.

(10) Patent No.: US 12,738,531 B2
(45) Date of Patent: Sep. 15, 2026

(54) SOLID STATE ELECTROLYTE AND LITHIUM-ION BATTERY INCLUDING SOLID STATE ELECTROLYTE

(71) Applicants: Microvast Power Systems Co., Ltd., Huzhou (CN); Microvast, Inc., Stafford, TX (US)

(72) Inventors: Wenjuan Liu Mattis, Longwood, FL (US); Jinbo He, Charlotte, NC (US); Bryan Yonemoto, Clearwater, FL (US)

(73) Assignees: MICROVAST POWER SYSTEMS CO., LTD., Huzhou (CN); MICROVAST, INC., Stafford, TX (US)

( * ) Notice: Subject to any disclaimer, the term of this patent is extended or adjusted under 35 U.S.C. 154(b) by 576 days.

(21) Appl. No.: 18/275,220

(22) PCT Filed: Jan. 31, 2022

(86) PCT No.: PCT/CN2022/075297

§ 371 (c)(1),
(2) Date: Aug. 1, 2023

(87) PCT Pub. No.: WO2022/166937

PCT Pub. Date: Aug. 11, 2022

(65) Prior Publication Data

US 2024/0072300 A1 Feb. 29, 2024

Related U.S. Application Data

(60) Provisional application No. 63/144,951, filed on Feb. 2, 2021.

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0082* (2013.01)

(58) Field of Classification Search
CPC .......... H01M 10/056; H01M 10/0562; H01M 10/052; H01M 10/0525; H01M 4/131; H01M 4/525; H01M 4/62
See application file for complete search history.

(56) References Cited

U.S. PATENT DOCUMENTS

| | | | |
|---|---|---|---|
| 2017/0237114 A1 | 8/2017 | Makino | |
| 2020/0020949 A1 | 1/2020 | Huang | |

FOREIGN PATENT DOCUMENTS

| | | | | |
|---|---|---|---|---|
| CN | 105470564 A | | 4/2016 | |
| CN | 109768320 A | * | 5/2019 | ........ H01M 10/0525 |
| JP | 2005082689 A | | 3/2005 | |
| WO | WO-2019050618 A1 | * | 3/2019 | .......... H01M 50/443 |

OTHER PUBLICATIONS

The extended European search report of EP patent application No. 22749216.2 issued on Mar. 6, 2025.
International Search Report of PCT Patent Application No. PCT/CN2022/075297 issued on Apr. 28, 2022.

* cited by examiner

*Primary Examiner* — Karie O'Neill Apicella
(74) *Attorney, Agent, or Firm* — Andrew C. Cheng

(57) ABSTRACT

A solid state electrolyte is provided, which includes a ligand composed of a ceramic powder and a nitrogen containing aromatic copolymer, the ceramic powder is the core and the receptor, the nitrogen containing aromatic copolymer is comprised by a first polymer and a second polymer, the first polymer is aromatic polyamide, the second polymer is selected from the group consisting of P2VP, P4VP, PVA, PEO and PAN. The solid state electrolyte can form good contact interfaces at the anode and cathode electrodes. A lithium-ion battery including the solid state electrolyte is also provided.

18 Claims, No Drawings

SOLID STATE ELECTROLYTE AND LITHIUM-ION BATTERY INCLUDING SOLID STATE ELECTROLYTE

CROSS-REFERENCE TO RELATED APPLICATION

This application is a 35 U.S.C. § 371 National Phase conversion of International (PCT) Patent Application No. PCT/CN2022/075297, filed on Jan. 31, 2022, which claims the priority of U.S. provisional patent application No. 63/144,951, filed on Feb. 2, 2021. The entire disclosure of the above-identified application is incorporated herein by reference. The PCT International Patent Application was filed and published in English.

TECHNICAL FIELD

The present application relates to lithium-ion battery, and particularly to solid state electrolyte.

BACKGROUND

The lithium-ion battery, originally commercialized in the early 1990s, has come to dominate the energy storage market for hand-held and electronic consumer devices. This is because the lithium-ion battery is rechargeable, and has high mass and volume energy density. Now the lithium-ion batteries are also being extensively investigated for electric vehicle applications. However, there are still issues with the delivered energy, power and safety of these technologies that must be improved.

One proposed way to address these issues is to use a solid state lithium-ion battery. In this type of battery, the traditional liquid electrolyte is replaced with a solid state material that conducts the lithium ions from the anode to the cathode. This type of battery is believed to be safer because it removes the flammable electrolyte, and may be able to provide higher energy densities for the battery at the car level because numerous safety mechanisms and protections for fire can be eliminated. However, these types of solid state materials are not widespread and commercially sold yet, partially because there are technical issues on getting and maintaining good performance repeatably with these types of batteries.

Electrolytes using solid state materials are solid state electrolytes. Compared with liquid electrolytes, solid state electrolytes have higher safety and thermal stability, it can prevent thermal runaway under high temperature or impact. In addition, solid state electrolyte makes it possible to use a lithium metal anode, due to its effective suppression of Li dendrite formation.

Solid state inorganic electrolyte is a kind of solid state electrolytes, solid state inorganic electrolytes generally have high ionic conductivities (>0.1 mS $cm^{-1}$ at RT), high moduli (for example, >1 GPa for oxides), and excellent thermal stability (stable above 100° C.). However, Solid state inorganic electrolytes also have disadvantages such as high mass density, fragility, poor contact with the electrodes, etc. For example, ceramic ion conducting material is a solid state inorganic material.

The first problem is the flexibility of the solid state inorganic material. When using ceramic ion conducting materials, which are desirable because of their high lithium-ion conductivity, the solid structure becomes brittle and is easily cracked during battery manufacture or operation. A crack in the solid state electrolyte creates the risk that lithium deposition on the anode will grow, possibly as a dendrite, through the solid state inorganic material and eventually contact the cathode creating an internal short. The cracking is made more easily by the high pressure that may be needed for the lithium-ion battery stack to ensure a good contact interface existing between the anode/cathode and solid state electrolyte. If these contact interfaces are not in good condition, the battery power becomes greatly reduced because there is a high resistance for lithium-ion flow during operation.

Poor flexibility of the solid state inorganic material also may create issues during processing. Present lithium-ion battery manufacturing often uses a roll to roll process, but the rigid structure of a ceramic ion conducting material and its inability to flex and bend makes it unsuited for this type of manufacture. As a result, pristine ceramic discs must be made and handled with great care to ensure that there is no chipping or cracking within the ceramic ion conducting material, or complicated and time consuming gas phase reactions may be necessary to apply the ceramic ion conducting material down onto the electrode. This is especially true for thin film solid state lithium-ion batteries, where they use ALD or CVD technologies, which require high vacuum, to deposit the ceramic ion conducting material onto a thin film of the electrode active materials.

It is also found that solid state inorganic materials are susceptible to degradation during lithium-ion battery operation. This is because during cycling the electrodes expand and contract in volume, which leads to gaps in the active material and solid state inorganic electrolyte, and may result in cracking occurring during operation within the solid state inorganic material.

Solid state polymer electrolyte is formed by mixing the polymer with conducting salts. It offers some advantages compared with solid state inorganic electrolyte, such as good flexibility, good processability, light weight, stable contact with the electrodes, wide electrochemical windows etc. But current solid state polymer electrolyte usually has a lower ionic conductivity at ambient condition (<0.01 mS $cm^{-1}$ at RT), lower mechanical strength, and more flammable than solid state inorganic electrolyte.

Alternatively, some solid state lithium-ion batteries are focused on a solid state polymer electrolyte that relies on the polymer to provide certain flexibility while also having enough conducting salts or liquid electrolytes phase so as it no longer flows freely, but flows enough to allow lithium-ion transport to occur. These technologies often have poor lithium-ion conduction between the anode and cathode electrodes, meaning they must be operated at higher temperatures or very low rates compared to solid state inorganic electrolytes. In addition, the stability of many of these polymer materials is limited. a limited voltage window restricts the types of materials that can be used in these batteries. If materials are selected within the voltage stability window, the energy density may suffer. If materials are selected beyond the voltage stability window, a solid state electrolyte interphase forms, similar to the liquid electrolyte batteries, which restricts lithium-ion conduction and leads to high overpotentials within the battery.

To try and improve the solid state electrolyte materials performance, specifications blends of polymer and ceramic materials have been disclosed. These systems try to take advantage of the ceramic materials improved ionic conduction, while using the polymer phase to enable roll to roll manufacturer and improve flexibility of the material so it is harder to crack and break during assembly or battery operation. While these techniques have been useful in making a solid state separator, which goes between the anode and cathode electrode, they are less effective at addressing the contact interfaces between the solid state electrolyte and the anode or cathode electrodes respectively. This is because those electrodes need to be mainly made of active material to deliver the energy density to the battery, which significantly limits the ability to blend effectively polymer and ceramic materials within the structure of the cathode and the anode.

What is needed is a solid state electrolyte material that can form good contact interfaces at the anode and cathode electrodes, and be processed to produce a solid, non-porous lithium-ion conducting layer that keeps the anode and cathode touching.

SUMMARY

In view of the above, it is necessary to provide a solid state electrolyte and a lithium-ion battery including the solid state electrolyte, which can form good contact interfaces at the anode and cathode electrodes.

The present application provides a solid state electrolyte, the solid state electrolyte includes a ligand composed by a ceramic powder and a nitrogen containing aromatic copolymer, the ceramic powder is the core and the receptor. The ceramic powder provides lithium ion transport channels, while is not electroconductive.

Further, the nitrogen containing aromatic copolymer is comprised by a first polymer and a second polymer, the first polymer is aromatic polyamide, the second polymer is selected from the group consisting of P2VP (Poly(2-vinylpyridine)), P4VP (Poly(4-vinylpyridine)), PVA (Polyvinyl alcohol), PEO (Polyethylene oxide) and PAN (Polyacrylonitrile).

The aromatic polyamide is selected from the group consisting of PPTA (Poly-p-phenylene Terephthalamide) and PMIA (Poly(m-phenylene isophthalamide).

The molecular weight percentage of the aromatic polyamide in the nitrogen containing aromatic copolymer is from 10% to 90%, or 20%~80%, or 30%-60%, or 30%~50%.

The nitrogen containing aromatic copolymer is a random copolymer, block copolymer or grafted copolymer, and is terminated with a —COOH group.

The aromatic polyamide is formed by the polymerization of diamine and acyl chloride, diamine is phenylenediamine, acyl chloride is benzoyl chloride.

THE PPTA is formed by the polymerization of p-phenylenediamine and terephthaloyl chloride, and/or the PMIA is formed by the polymerization of m-phenylenediamine and isophthaloyl chloride.

The Rg of the nitrogen containing aromatic copolymer in a solvent is in the range of 1~100 nm, or 5-50; the solvent is selected from the group consisting of DMAc, DMF and NMP.

The ceramic powder is selected from the group consisting of the Garnet ceramic, Perovskite-type ceramic, LISICON-type ceramic and Sulfide-type ceramics.

An average particle size of the ceramic powder is in the range of 10~0000 nm, or 50-1000 nm.

The solid state electrolyte also comprises conducting salt, the conducting salt is selected from the group consisting of LiTFSI, $LiClO_4$ and $LiPF_6$.

The weight percentage ratio between the conducting salt and the nitrogen containing aromatic copolymer is in the range of 5%~20%, or 8-15%.

The weight percentage ratio between the nitrogen containing aromatic copolymer and the ceramic powder is in the range of 10%~50%.

The present application also provides a lithium-ion battery, the lithium-ion battery comprises a solid state electrolyte as described above.

The solid state electrolyte is a solid non-porous layer that can conduct lithium ions but not electrons, the solid state electrolyte is 500 nm to 50 um in thickness, or 5 to 20 um in thickness.

As a separate electrolyte layer, the solid state electrolyte is sandwiched between the anode electrode and the cathode electrode, and adheres to the surface of the electrodes, thereby can effectively transport lithium ions from the anode to the cathode.

The present application still provides a lithium-ion battery, the lithium-ion battery comprises a cathode electrode and an anode electrode, the cathode electrode or/and the anode electrode comprises the material of the solid state electrolyte as describe above, the material of the solid state electrolyte is less than 50 weight % in the cathode electrode, or less than 30 weight % therein, and/or the material of the solid state electrolyte is less than 20 weight % in the anode electrode, or less than 10 weight %.

Mixing the solid state electrolyte material into the cathode or/and anode material to form a new cathode or/and anode, cathodes or/and anodes mixed with solid state electrolyte materials can achieve higher efficiency ionic conductivity.

The PPTA or PMIA part of the nitrogen containing aromatic copolymer will interdigitate to form hydrogen bonding, which provides the solid state electrolyte with the strong mechanical strength, flexibility, good adhesion and self-healing properties. The conducting salt will be solvated in the P2VP, P4VP, PVA, PEO or PAN part of the nitrogen containing aromatic copolymer forming passages for lithium-ions going through. By controlling the length of these passages in the range of several nanometers, the impact on the ion conductivity of the composite solid state electrolyte can be minimized. The nitrogen containing aromatic copolymer maybe bound directly to the ceramic powder surface, or may be attached through hydrogen bonds or van der wall bonds. The nitrogen containing aromatic copolymer and the ceramic powder form a core-shell structure, the ceramic powder is the core, which provides high-speed lithium ion transport channels. This structure ensures the uniformity and high efficiency of the lithium ion channel, so the conductivity is greatly improved.

The nitrogen containing aromatic copolymer of the present application is comprised of PPTA or PMIA copolymerized with P2VP, P4VP, PVA, PEO, PAN, the advantage of the present solid state electrolyte, compared with the solid state electrolyte made by simply mixing the inorganic solid state electrolyte particle, the PPTA or PMIA polymer, the lithium salt, and the lithium salt host polymer such as PEO, is the following. Firstly, by simply mixing these components together, the phase separation of different components will be at the micron scale. The passage for lithium-ion through the polymer is significantly larger than the present application that is controlled at nanoscale. In turn, the conductivity of the solid state electrolyte made by simply mixing the components together will be much lower than the present application. Secondly, without the core-shell structure present, the interaction between the PPTA or PMIA polymer will not be uniformly distributed through the solid state electrolyte, which will lower the mechanical strength of the solid state electrolyte. Thirdly, without a uniform distribution of the PPTA or PMIA at molecular level throughout the entire system, the self-healing feature that is enabled by the interdigitation of the aramid polymer chain will not be present. Simply mixing the PPTA or PMIA with other components will results in a macro-phase separation, where the hydrogen bonding is not uniformly presented.

In addition, if the PMIA-PEO copolymerization is not carried out, the pure PPTA and PMIA polymers themselves cannot be directly dissolved in the solvent DMAc, and the solid electrolyte cannot be prepared by a simple mixing method.

DESCRIPTION OF EMBODIMENTS

Exemplary embodiments of the present application are described in detail, but the present application is not limited to the following embodiments.

The terms "first", "second", "third", "fourth", etc. in the description and claims of the present application are all used for distinguishing similar objects rather than describing a particular sequence or order.

The lithium-ion battery of the present application is enclosed and sealed within a non-permeable pouch bag or metal casing. The lithium-ion battery may then be placed in parallel or in series, or some combination thereof, to form a larger lithium-ion battery module or pack. The lithium-ion battery includes an anode, a cathode and a solid state electrolyte. The anode includes a metal foil and anode active material coated on one side or two side of the metal foil, the cathode includes a metal foil and cathode active material coated on one side or two side of the metal foil. The anode metal foil may be selected from copper, nickel, titanium, aluminum, or some combination thereof. The cathode metal foil may be selected from aluminum, nickel, titanium or some combination thereof. The metal foil will be from 1 um to 100 um in thickness, or 3-20 um in thickness. The solid state electrolyte is sandwiched between anode electrode and cathode electrode, and is used to transport the lithium-ions from the anode to the cathode, in the other word, is electrically non-conductive but lithium-ion conductive.

The solid state electrolyte of the present application includes a nitrogen containing aromatic copolymer and ceramic powder, the nitrogen containing aromatic copolymer is comprised of PPTA or PMIA copolymerized with P2VP, P4VP, PVA, PEO, PAN, The Rg (Radius of gyration) of the nitrogen containing aromatic copolymer in a solvent (such as DMAc or NMP) is in the range of 1~100 nm, the molecular weight percentage of the PPTA or PMIA in the nitrogen containing aromatic copolymer is from 10% to 90%, the nitrogen containing aromatic copolymer is a random copolymer, block copolymer or grafted copolymer, and is terminated with a —COOH group. Further, the PPTA is formed by the copolymerization of p-phenylenediamine and terephthaloyl chloride, the PMIA is formed by the copolymerization of m-phenylenediamine and isophthaloyldichloride.

The solid state electrolyte is a solid non-porous layer that can conduct lithium ions but not electrons, the solid state electrolyte is 500 nm to 50 um in thickness, or 5 to 20 um in thickness. The solid state electrolyte maybe precut and placed between the anode and the cathode as an individual piece. The solid state electrolyte maybe a single continuous piece that is added therebetween through Z folding. The solid state electrolyte has certain flexibility and will be able to bend around a roll that is between 1 millimeter to 1 meter in diameter.

The ceramic powder is selected from one or more of the Garnet-type ceramic, Perovskite-type ceramic, LISICON-type ceramic and Sulfide-type ceramics, the particle size thereof is in the range of 10~10000 nm. The solid state electrolyte also includes conducting salt, the conducting salt is selected from one or more of LiTFSI, $LiClO_4$ and $LiPF_6$, The weight percentage ratio between the nitrogen containing aromatic copolymer and the ceramic powder is in the range of 10%~50%, the weight percentage ratio between the conducting salt and the nitrogen containing aromatic copolymer is in the range of 5%~20%.

The nitrogen containing aromatic copolymer is mixed with the ceramic powder and conducting salt in a solvent such as DMAc, DMF or NMP to form a mixed solution. Such a nitrogen containing aromatic copolymer will preferentially bind on the surface of the ceramic powder due to the favorable interaction between nitrogen containing aromatic copolymer's functional group and the ceramic powder. The solid concentration of the mixed solution is in the range of 10~90%, prepared with mixing, ball milling, sand milling, or extrusion.

The mixed solution will be cast by a T-die onto a substrate into an oven to form a continuous film of solid-state electrolyte. The drying temperature is in the range of 100~200° C. The film of solid-state electrolyte will be further hot compressed with a hot roll to reduce the thickness thereof and anneal of the nitrogen containing aromatic copolymer. The PPTA or PMIA part of the nitrogen containing aromatic copolymer will interdigitate to form hydrogen bonding, which provides the solid state electrolyte with the strong mechanical strength, flexibility, good adhesion and self-healing properties. The conducting salt will be solvated in the P2VP, P4VP, PVA, PEO or PAN part of the nitrogen containing aromatic copolymer forming passages for lithium-ions going through. By controlling the length of these passages in the range of several nanometers, the impact on the ion conductivity of the composite solid state electrolyte can be minimized. The final thickness of the solid-state electrolyte is in the rage of 10~50 μm.

The nitrogen containing aromatic copolymer maybe bound directly to the ceramic powder surface, or may be attached through hydrogen bonds or van der wall bonds. The nitrogen containing aromatic copolymer and the ceramic powder form a core-shell structure, the ceramic powder is the core, which provides high-speed lithium ion transport channels. This structure ensures the uniformity and high efficiency of the lithium ion channel, so the conductivity is greatly improved.

A conductive element may be added to the anode electrode, such as conductive carbons, the weight percent thereof will be less than 20%, or less than 10%, or less than 5%. Solid state electrolyte material may also be added to the anode electrode, with no more than 20 weight percent of the anode electrode, or no more than 10%. The anode electrode will have 0-50 $mAh/cm^2$ of single sided geometric capacity, or is from 1-10 $mAh/cm^2$.

In an embodiment, the anode electrode will be a single piece of the film metal foil or will have no active material at the start and shall become a thin film of lithium metal foil during operation as lithium ions from the cathode are charged to the anode.

The cathode electrode may be comprised of active material selected from FCG, NMC, NCA, NMCA, LFP, LMNFP, LMNO, LMO, LCO, lithium-metal-fluorosulfates, lithium-metal-fluorophosphates, or metal oxides. In an embodiment, the cathode active material will be a layered 2-dimensional metal oxide such as FCG, NMC, NCA, NMCA or LCO. The cathode active material will be present in 50-100 wt %. The cathode electrode may include conductive carbon. Examples of such carbon are CNT, VGCF, super P, carbon black or graphene. The conductive carbon may be present in no more than 20 weight percent, or no more than 10 weight percent. The cathode electrode comprises the material of the solid state electrolyte, the material of the solid state electrolyte is less than 50 weight % of the cathode electrode, or less than 30 weight % thereof.

Adding the solid state electrolyte into the cathode electrode or/and the anode electrode can provide good contact and ionic conductivity with electrodes. To ensure good interfaces between the electrodes and the solid state electrolyte, pressure may be applied externally to the battery. The force applied will help ensure that the contact interfaces between the electrodes and solid state electrolyte don't separate, and that good contact is maintained therebetween to help ensure uniform lithium-ion conduction.

The proposed battery has a midpoint voltage between 1.5 and 4.5V. The battery may operate between negative 60 degrees Celsius and 200 degrees Celsius, or with a range of negative 30 degrees Celsius to 60 degrees Celsius. The size of the anode, the cathode and solid state electrolyte are not limited, and they exist from millimeters to meters in dimension.

The evaluation method of the solid-state electrolyte and lithium-ion batteries made by it are summarized below.

1. Mechanical characterization: The tensile mechanical properties of the solid-state electrolyte membranes were investigated using a multifunctional Instron mechanical tester with a testing speed of 200 mm/s on a 10 mm wide strip.
2. Ionic conductivity measurements: solid-state electrolyte was assembled into a coin battery with stainless steel electrodes. Electrochemical impedance spectroscopy (EIS) was performed in the temperature range of 25-80° C. using an electrochemical workstation in the frequency range of 1 MHz to 0.1 Hz. The ionic conductivity ($\sigma$) is given by Equation: $\sigma$=L/RS, where R is the resistance value of the bulk solid state electrolyte; L is the thickness of the solid-state electrolyte membrane (~20 μm), and S is the effective area of contact between the solid state electrolyte and the stainless-steel electrode.
3. lithium-ion transference number measurements: the lithium ion transference number ($t_{Li+}$) was calculated using Equation below:

$$t_{Li+}=I_1(V-I_0R_0)/I_0(V-I_1R_1)$$

where V is the applied DC voltage; $I_0$ and $I_1$ are the initial and steady currents, respectively, and $R_0$ and $R_1$ are the charge-transfer resistances before and after DC polarization.

4. The cycling performance of the lithium-ion battery was tested at 25° C. in an environment chamber with a charging and discharging rate of 0.2 C in the voltage range of 2.7-4.2 V.
5. Radius of gyration (Rg) was determined by a dynamic light scattering tester. Copolymer ligands were first dissolved in DMAc with a concentration of 1 mg/ml as the solution to be tested. Then the solution was tested by a Zetasizer Nano system from Malvern, and a Z-average diameter was determined. The Rg=0.5*Z-average diameter.

Example 1: (PMIA-PEO)

M-phenylenediamine and $NH_2$-$(PEO)_n$-$NH_2$(PEO molecular weight of 1500), were first dissolved in DMAc with an amine molar ratio of 95:5. The solution concentration is 5 wt %. The solution was cooled to −15° C. before the copolymerization. Isophthaloyl chloride was slowly added to the solution to avoid a fast temperature rising. The molar ratio between the dichloride and m-phenylenediamine was kept at 101:100. The polymerization was terminated by adding calcium hydroxide (1:1 molar to dichloride) into the reaction solution. The polymer was precipitated from the solution by adding pure water into the reaction solution, washed repeatedly with pure water, and then dried in the vacuum oven for 24 hrs at 60° C. before use. The radius of gyration of the copolymer was determined by light scattering to be about 5 nm in DMAc.

Example 2: (PMIA-PEO)

M-phenylenediamine and $NH_2$-$(PEO)_n$-$NH_2$(PEO molecular weight of 10000), were first dissolved in DMAc with an amine molar ratio of 99:1. The solution concentration is 2 wt %. The solution was cooled to −15° C. before the copolymerization. Isophthaloyl chloride was slowly added to the solution to avoid a fast temperature rising. The molar ratio between the dichloride and m-phenylenediamine was kept at 101:100. The polymerization was terminated by adding calcium hydroxide (1:1 molar to dichloride) into the reaction solution. The polymer was precipitated from the solution by adding pure water into the reaction solution, washed repeatedly with pure water, and then dried in the vacuum oven for 24 hrs at 60° C. before use. The radius of gyration of the copolymer was at about 25 nm in DMAc.

Example 3

25.5 wt % of LLZO nanoparticles (is a type of Garnet ceramic) with an average particle size of about 500 nm, 4.5 wt % synthesized PMIA-PEO random copolymer (was made the same as in example 2) with Rg of about 25 nm to obtain ligand stabilized LLZO nanoparticle, 0.1M LITFSI in solution, and 70 wt % of DMF was first mixed together and ball milled fully to form ligands stabilized LLZO nanoparticle solution. The mixed solution was cast by a T-die onto a substrate and transferred into an oven. The drying temperature is about 150° C. A free-standing film of solid-state electrolyte was generated. The film of solid-state electrolyte was then further hot compressed with a hot roller (up to 250° C.) to reduce the thickness to about 20 microns and anneal the polymer ligands. The tensile strength of this example is about 30 MPa, with an elongation of 50%. The ionic conductivity is 0.11 mS $cm^{-1}$ at room temperature, with Li-ion transference number of 0.5.

Example 4

21 wt % of LLZO nanoparticles with an average particle size of about 50 nm, 9 wt % synthesized PMIA-PEO random copolymer (was made the same as in example 1) with Rg of about 5 nm to obtain ligand stabilized LLZO nanoparticle, 0.1M LITFSI in solution, and 70 wt % of DMF was first mixed together and ball milled fully to form ligands stabilized LLZO nanoparticle solution. The mixed solution was cast by a T-die onto a substrate and transferred into an oven. The drying temperature is about 150° C. A free-standing film of solid-state electrolyte was generated. The film of solid-state electrolyte was then further hot compressed with a hot roller (up to 250° C.) to reduce the thickness to about 20 microns and anneal the polymer ligands. The tensile strength of this example is about 15 MPa, with an elongation of 30%.

The ionic conductivity is about 1 mS $cm^{-1}$ at room temperature, with Li-ion transference number of 0.75.

Example 5

Dried ligand stabilized LLZO nanoparticle was made the same as in example 3 with simply drying out the solution at 40° C. overnight in a vacuum oven. No T-die casting and hot compressing are needed. A cathode was made with NMC 811 (93 wt %), Super P (1.5 wt %), PVDF (1 wt %) and dried LLZO nanoparticles (4.5 wt %). An anode was made with Graphite (93 wt %), Super P (1.5 wt %), PVDF (1 wt %) and dried LLZO nanoparticles (4.5 wt %). A coin cell was made by stacking cathode/solid-state electrolyte/anode first, following by a hot compressing (0.5 MPa, 130° C., 1 min) to improve the contact at all interfaces. Cycling was conducted with the voltage from 2.7-4.2V at 0.2 C rate at 25° C. The columbic efficiency is 100%. The capacity retention is 99.2% for 150 cycles.

Example 6

Dried ligand stabilized LLZO nanoparticle was made the same as in example 4 with simply drying out the solution at 40° C. overnight in a vacuum oven. No T-die casting and hot compressing are needed. A cathode was made with NMC 811 (93 wt %), Super P (1.5 wt %), PVDF (1 wt %) and dried LLZO nanoparticles (4.5 wt %). An anode was made with Graphite (93 wt %), Super P (1.5 wt %), PVDF (1 wt %) and dried LLZO nanoparticles (4.5 wt %). A coin cell was made by stacking cathode/solid-state electrolyte/anode first followed by a hot compressing (0.5 MPa, 130° C., 1 min) to improve the contact at the interfaces. Cycling was conducted with the voltage from 2.7-4.2V at 0.2 C rate at 25° C. The columbic efficiency is 100%. The capacity retention is 99.5% for 150 cycles.

Example 7

Dried ligand stabilized LLZO nanoparticle was made the same as in example 4 with simply drying out the solution at 40° C. overnight in a vacuum oven. No T-die casting and hot compressing are needed. A cathode was made with NMC 811 (93 wt %), Super P (1.5 wt %), PVDF (1 wt %) and dried LLZO nanoparticles (4.5 wt %). A lithium metal foil was served as the anode. A coin cell was made by stacking cathode/solid-state electrolyte first followed by a hot compressing (0.5 MPa, 130° C., 1 min) to improve the contact at the interfaces. Then the anode was assembled into the case. Cycling was conducted with the voltage from 2.7-4.2V at 0.2 C rate at 25° C. The columbic efficiency is 100%. The capacity retention is 99% for 300 cycles.

Comparative Example 1

A control sample coin cell was made with the same cathode and anode as in Example 7 but with a liquid electrolyte (40 wt % EC/60 wt % EMC, 1M $LiPF_6$), and a 16-micron wet-process PE separator. Cycling was conducted with the voltage from 2.7-4.2V at 0.2 C rate at 25° C. The columbic efficiency is 99%. The capacity retention is 83% for 50 cycles.

The above are embodiments of the present application only, and should not be deemed as limitations to the scope of the present application. It should be noted that similar variations will become apparent to those skilled in the art to which the present application pertains. Therefore, the scope of the present application is defined by the appended claims.

The invention claimed is:

1. A solid state electrolyte, comprising a ceramic powder and a ligand composed by a nitrogen containing aromatic copolymer, the ceramic powder is a core and a receptor;

wherein the nitrogen containing aromatic copolymer is comprised by a first polymer and a second polymer, the first polymer is an aromatic polyamide, the second polymer is selected from a group consisting of P2VP, P4VP, PVA, PEO and PAN;

wherein the aromatic polyamide is selected from a group consisting of PPTA and PMIA; and wherein the Rg of the nitrogen containing aromatic copolymer in a solvent is in a range of 1~100 nm.

2. The solid state electrolyte of claim 1, wherein molecular weight percentage of the aromatic polyamide in the nitrogen containing aromatic copolymer is from 10% to 90%, or 20%~80%, or 30%~60%, or 30%~50%.

3. The solid state electrolyte of claim 1, wherein the nitrogen containing aromatic copolymer is a random copolymer, a block copolymer or a grafted copolymer, and is terminated with a —COOH group.

4. The solid state electrolyte of claim 1, wherein the aromatic polyamide is formed by polymerization of diamine and acyl chloride.

5. The solid state electrolyte of claim 1, wherein the PPTA is formed by polymerization of p-phenylenediamine and terephthaloyl chloride, and/or the PMIA is formed by polymerization of m-phenylenediamine and isophthaloyl chloride.

6. The solid state electrolyte of claim 1, wherein the Rg of the nitrogen containing aromatic copolymer in a solvent is in a range of 5-50 nm.

7. The solid state electrolyte of claim 1, wherein the ceramic powder is selected from a group consisting of Garnet ceramics, Perovskite-type ceramics, LISICON-type ceramics and Sulfide-type ceramics.

8. The solid state electrolyte of claim 1, an average particle size of the ceramic powder is in a range of 10~10000 nm, or 50-1000 nm.

9. The solid state electrolyte of claim 1, wherein the solid state electrolyte also comprises conducting salt.

10. The solid state electrolyte of claim 9, wherein a weight percentage ratio between the conducting salt and the nitrogen containing aromatic copolymer is in a range of 5%~20%, or 8-15%.

11. The solid state electrolyte of claim 1, wherein a weight percentage ratio between the nitrogen containing aromatic copolymer and the ceramic powder is in a range of 10%~50%.

12. A lithium-ion battery, wherein the lithium-ion battery comprises the solid state electrolyte of claim 1.

13. The lithium-ion battery of claim 12, wherein the solid state electrolyte is 500 nm to 50 μm in thickness, or 5 to 20 μm in thickness.

14. A lithium-ion battery, wherein the lithium-ion battery comprises a cathode electrode and an anode electrode, the cathode electrode or/and the anode electrode comprise(s) the material of the solid state electrolyte of claim 1.

15. The solid state electrolyte of claim 4, wherein the diamine is phenylenediamine, and the acyl chloride is benzoyl chloride.

16. The solid state electrolyte of claim 6, wherein the solvent is selected from a group consisting of DMAc, DMF and NMP.

17. The solid state electrolyte of claim 9, wherein the conducting salt is selected from a group consisting of LiTFSI, LiClO4 and $LiPF_6$.

18. The lithium-ion battery of claim 14, wherein the material of the solid state electrolyte is less than 50 weight % in the cathode electrode, or less than 30 weight % therein, and/or the material of the solid state electrolyte is less than 20 weight % in the anode electrode, or less than 10 weight %.

* * * * *